(12) United States Patent
Binienda et al.

(10) Patent No.: US 7,353,103 B2
(45) Date of Patent: Apr. 1, 2008

(54) FUEL SYSTEM PERFORMANCE MONITOR

(75) Inventors: Gary J. Binienda, Clarkston, MI (US); Hussein A. Dourra, Bloomfield, MI (US); Ali Mourtada, Dearborn Heights, MI (US); Fadi S. Kanafani, Windsor (CA)

(73) Assignee: Chrysler LLC, Auburn Hills, MI (US)

( * ) Notice: Subject to any disclaimer, the term of this patent is extended or adjusted under 35 U.S.C. 154(b) by 23 days.

(21) Appl. No.: 11/468,011

(22) Filed: Aug. 29, 2006

(65) Prior Publication Data
US 2008/0059046 A1 Mar. 6, 2008

(51) Int. Cl.
F02D 41/02 (2006.01)
(52) U.S. Cl. ........................................... 701/103
(58) Field of Classification Search .......... 701/102, 701/103–105, 115; 123/480
See application file for complete search history.

(56) References Cited

U.S. PATENT DOCUMENTS 5,959,825 A * 9/1999 Harcombe ............... 361/154
6,526,948 B1 * 3/2003 Stavnheim et al. ........ 123/497
6,855,092 B2 2/2005 Duty et al.

FOREIGN PATENT DOCUMENTS

FR 2 872 200 A1 * 12/2005

* cited by examiner

Primary Examiner—Hieu T. Vo
(74) Attorney, Agent, or Firm—Ralph E. Smith

(57) ABSTRACT

A system for monitoring performance of a fuel system in a vehicle includes a plurality of sensing modules that periodically sense data from a plurality of control systems in the vehicle during a predetermined evaluation period. The system includes a control module that analyzes the data after the evaluation period, generates performance ratings for the control systems based on the data, generates a set of values for the performance of the fuel system based on the performance ratings and a plurality of predetermined fuzzy logic rules, and generates a control signal based on a numerical analysis of the set of values. The system includes an indicator module that indicates in real time whether the performance of the fuel system conforms to a designed performance of the vehicle based on the control signal.

18 Claims, 4 Drawing Sheets

FUEL SYSTEM PERFORMANCE MONITOR

FIELD OF THE INVENTION

The present invention relates to powertrain systems, and more specifically to monitoring fuel system performance.

BACKGROUND OF THE INVENTION

Fuel economy is an important consideration in designing a vehicle. Engineers attempt to design control systems such as automatic transmissions, valve timing systems, throttle control systems, etc., to achieve optimum fuel efficiency relative to the performance of the vehicle. Improper vehicle utilization and imprudent driving behavior may, however, adversely affect fuel efficiency of the vehicle. Therefore, a system that indicates the state of fuel consumption of the vehicle to a driver may be desirable. The driver may use this information to alter vehicle utilization and driving habits to realize the designed fuel efficiency of the vehicle.

SUMMARY OF THE INVENTION

A system for monitoring performance of a fuel system in a vehicle includes a plurality of sensing modules that periodically sense data from a plurality of control systems in the vehicle during a predetermined evaluation period. The system includes a control module that analyzes the data after the evaluation period, generates performance ratings for the control systems based on the data, generates a set of values for the performance of the fuel system based on the performance ratings and a plurality of predetermined fuzzy logic rules, and generates a control signal based on a numerical analysis of the set of values. The system includes an indicator module that indicates in real time whether the performance of the fuel system conforms to a designed performance of the vehicle based on the control signal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
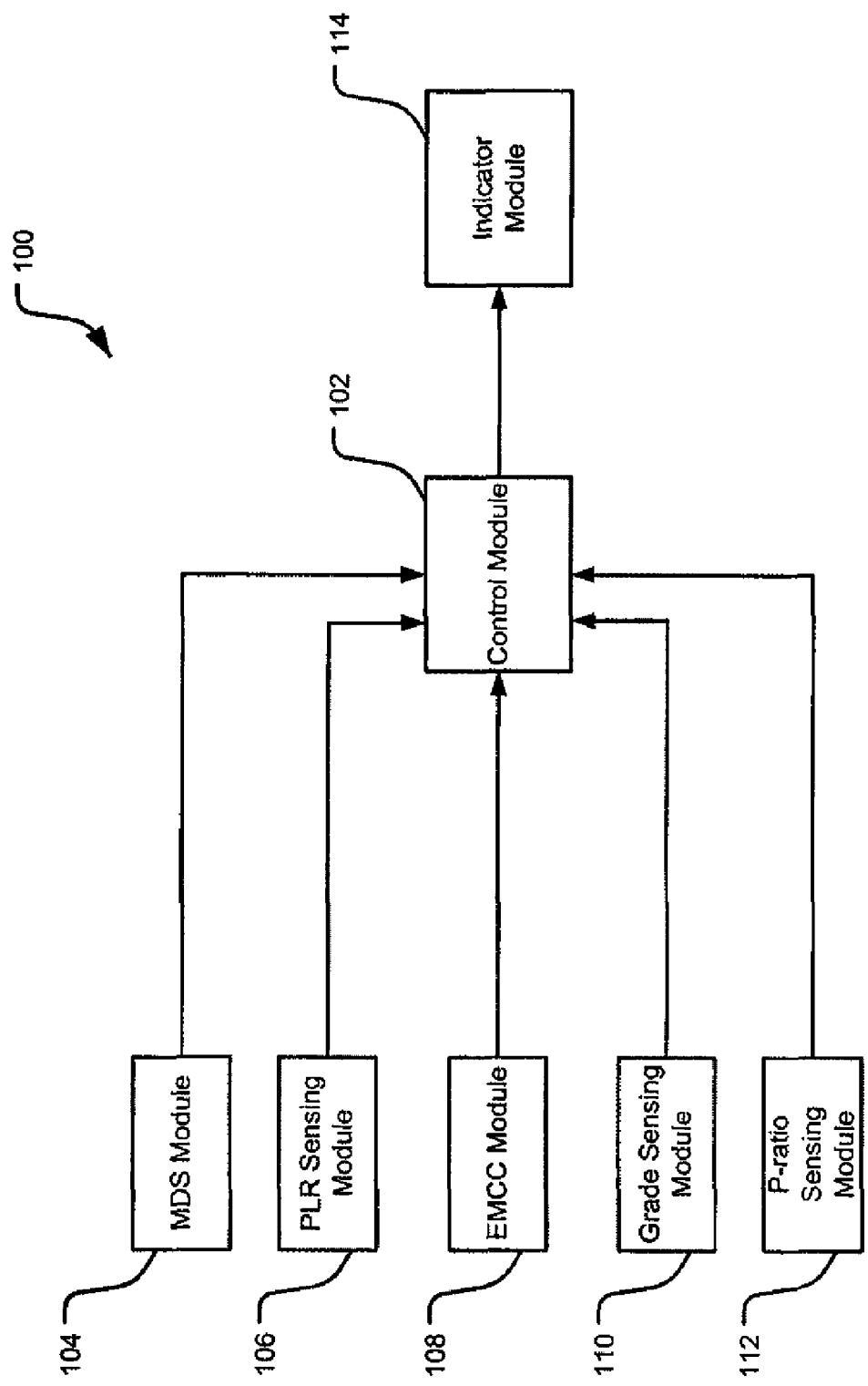
FIG. 1 is a block diagram of an exemplary system for monitoring performance of a fuel system of a vehicle.

Performance of a fuel system of a vehicle can be determined by analyzing data from multiple control systems in the vehicle. Referring now to FIG. 1, a system 100 for monitoring performance of a fuel system of a vehicle comprises a control module 102. The control module 102 receives data from a multi-displacement system (MOS) module 104, a performance level request (PLR) sensing module 106, an electronically modulated converter clutch (EMCC) module 108, a grade sensing module 110, and a P-ratio sensing module 112 (collectively control systems). As can be appreciated, other control systems and operating parameters that can affect fuel consumption may be included in the system 100.

The control module 102 periodically analyzes the data received from the control systems to determine the performance of the fuel system in real time. The control module 102 generates a control signal based on the data received from the control systems. An indicator module 114 provides the driver with a tactile feedback about the performance of the fuel system of the vehicle based on the control signal.

The indicator module 114 may comprise a variety of audio-visual indicators. For example, the indicator module may comprise a visual indicator such as an LED, a multi-color LED, a set of LED's with colors such as red, green, yellow, etc., or an LCD display. Alternately, a visual indicator may be in the form of a dial with a needle. The indicator module 114 may comprise an audio indicator such as a beeping sound, a set of words, etc.

If an LED is used, for example, the control signal from the control module 102 may turn the LED red or green to indicate whether the fuel economy under the current operating conditions is bad or good, respectively, relative to a designed fuel consumption rating of the vehicle. Additionally, the state of the fuel economy can be indicated on a graded scale. For example, a yellow LED may be lit to indicate that the fuel economy is moderate, that is, neither good nor bad.

A multi-displacement system (MDS) alternates between a fuel efficient or economy mode (e.g., four-cylinder mode) and a high power mode (e.g., V-8) depending on power demanded by the driver. The vehicle operates in high power mode when the driver demands more power by suddenly pressing down on the accelerator pedal.

On the other hand, the vehicle operates in economy mode when the driver demands less power by gradually pressing the accelerator pedal. This optimizes fuel economy when high power is not needed, without sacrificing vehicle performance. The less time the vehicle operates in the economy mode, the lower the fuel economy. The MDS module 104 periodically communicates to the control module 102 whether the MDS system is in economy mode or high power mode The PLR sensing module 106 indicates a performance level requested by the driver. Specifically, the PLR sensing module 106 senses a rate of displacement of the accelerator pedal initiated by the driver. The PLR sensing module 106 may use an electronic throttle control (ETC) system to determine the rate of displacement of the accelerator pedal when the driver requests more power.

The ETC system may respond aggressively to attain the requested performance or delay the response to optimize fuel economy. For example, a quick pedal motion may open the throttle more than the same pedal movement done slowly. The higher the frequency with which the driver suddenly requests more power, the lower the fuel economy.

The PLR sensing module 106 periodically communicates to the control module 102 the level of aggressiveness with which the driver requests power. That is, the PLR module 106 communicates a rate of throttle movement in response to the requests for performance. A higher rate of throttle movement implies requests for sudden increase of power as opposed to gradual requests for more power.

An EMCC system electronically modulates torque converter slippage to improve shift feel and fuel economy. The EMCC system can be engaged at lower speeds and disengaged when the driver demands performance. The longer the vehicle operates in EMCC mode, the better the fuel economy. The EMCC module 108 periodically communicates to the control module 102 whether the EMCC system is engaged or not.

The grade sensing module 110 periodically senses and communicates to the control module 102 the loading on the vehicle due to grade or road gradient. Specifically, the grade sensing module 110 determines that the road load is negative when the vehicle travels downhill and that the road load is positive when the vehicle travels uphill.

The extent to which the value of the road load is negative or positive is determined by the road gradient. The road load affects fuel consumption. Fuel economy is better when the vehicle travels downhill than when the vehicle travels uphill. The effect of the road load on fuel economy is compounded when the vehicle tows a trailer.

P-Ratio is a measure of pumping loss. Pumping loss is a function of barometric pressure. Specifically, P-ratio is a function of the ratio of manifold absolute pressure (MAP) to barometric pressure (Baro). That is, P-ratio=MAP/Baro. For the operating condition, the higher the P-Ratio, the better the fuel economy. The P-ratio module 112 periodically calculates P-ratio and communicates it to the control module 102.

The control module 102 periodically evaluates the performance of the control systems. A typical evaluation period may be five seconds. Although an evaluation period of five seconds is used throughout the detailed description for illustrative purposes, the evaluation period can be any time interval.

During the five second period, each control system, such as the MDS module 104, the PLR sensing module 106, etc., communicates periodically the status of that control system to the control module 102. Typically, each control system may report the status every 10 milliseconds. Like the evaluation period, although a reporting period of 10 ms is used throughout the detailed description for illustrative purposes, the reporting period can be any time interval.

Figure 2:
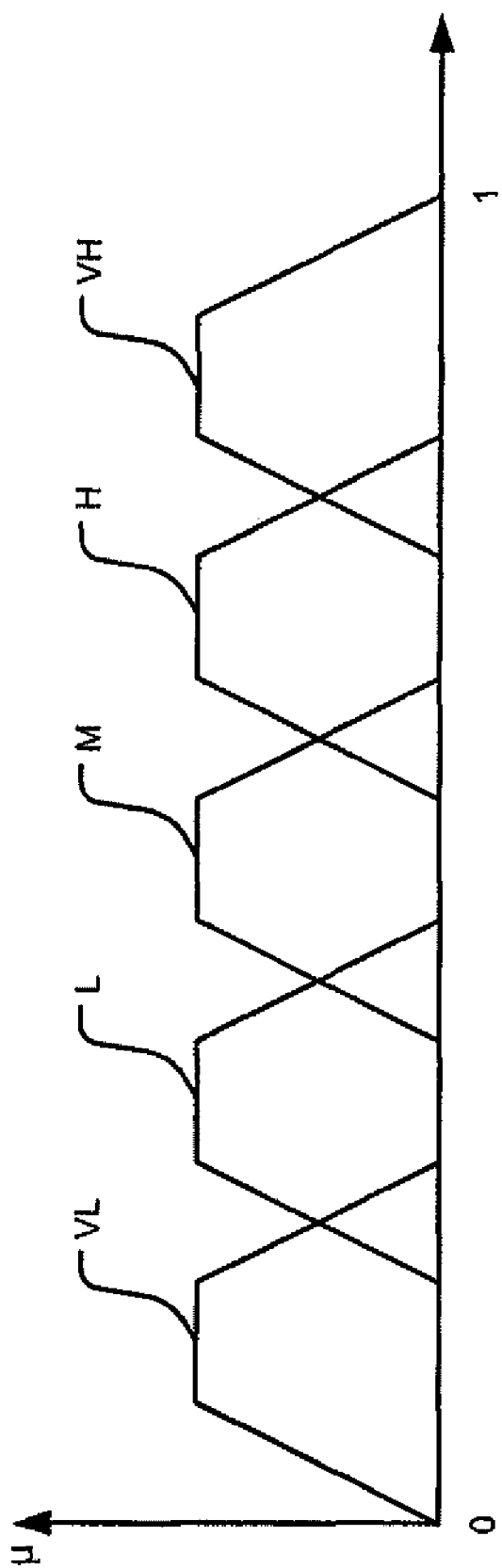
FIG. 2 is a graph of an exemplary membership function.

Each control system module is described by a fuzzy set using Gaussian Normal membership function. Each control system module evaluates a membership $\mu$ which consists of five linguistic values VH, H, M, L, and VL which stand for very high, high, medium, low, and very low, respectively. The linguistic values are defined with membership functions over a universe of discourse as shown in FIG. 2.

For example, the MDS module 104 may report every 10 ms whether the MDS system is in high power mode or in economy mode. During every five-second period, the control module 102 calculates the actual time the MDS module 104 is in the economy mode, which is a point in the universe of discourse over which the MDS fuzzy set is defined. The position of actual time determines the membership of the associated linguistic values $\mu_{MDS}$ (VL), $\mu_{MDS}$ (L), $\mu_{MDS}$ (M), $\mu_{MDS}$ (H), and $\mu_{MDS}$ (VH).

The control module 102 similarly evaluates the degree of performance for each control system. That is, the control module 102 calculates $\mu$ for each control system every five seconds. For example, the control module 102 calculates the actual time the EMCC system was engaged, which is a point in the universe of discourse over which the EMCC fuzzy set is defined. The position of actual time determines the membership of the associated linguistic values $\mu_{EMCC}$ (VL), $\mu_{EMCC}$ (L), $\mu_{EMCC}$ (M), $\mu_{EMCC}$ (H), and $\mu_{EMCC}$ (VH). The actual time for the EMCC system to be engaged is calculated by counting a number of times, N, the EMCC system was engaged based on the data provided by the EMCC module 108 every 10 ms during the five-second evaluation period, and multiplying N by the reporting period of 10 ms. The control module 102 calculates $\mu_{EMCC}$ (VL), $\mu_{EMCC}$ (L), $\mu_{EMCC}$ (M), $\mu_{EMCC}$ (H), and $\mu_{EMCC}$ (VH) based on the actual time of EMCC engagement.

Whether a very high performance rating for a particular control system indicates good fuel economy depends on the control system. For example, a very high value of $\mu_{MDS}$ (VH) for the MDS system indicates that the MDS system is in economy mode for most of the time during the evaluation period. Thus, a very high value of $\mu_{MDS}$ (VH) indicates good fuel economy. Similarly, a very high value of $\mu_{EMCC}$ (VH) for the EMCC system indicates good fuel economy.

On the other hand, a very high value of $\mu_{PLR}$ (VH) for the control system utilizing the PLR sensing module 106 indicates that the driver has either gradually requested more power instead of suddenly requesting more power or that the driver requested no additional power. Thus, a very high value of $\mu_{PLR}$ (VH) for the control system utilizing the PLR sensing module 106 indicates good fuel economy.

A very high value of $\mu_{GRAD}$ (VH) for the control system utilizing the grade sensing module 110 indicates that the vehicle is operating on a relatively flat terrain without frequent changes in gradient. Alternately, a very high value of $\mu_{GRAD}$ (VH) for the control system utilizing the grade sensing module 110 indicates that the vehicle is operating on a road having relatively constant gradient (uphill or downhill). Consequently, road load is relatively constant and fuel economy is good.

The control module 102 utilizes a fuzzy controller comprising multiple sets of fuzzy logic rules or fuzzy controller rules that use the performance ratings of the control systems in various combinations to determine the state of fuel economy every five seconds. Five exemplary sets of rules are described herein. As can be appreciated, additional rules may be formulated. Each set may comprise a plurality of rules.

The construction of the fuzzy controller rules is based on a linguistic control protocol, which is described by a set of conditional rules that comprise a left hand (LHS) side and a right hand side (RHS). The LHS is an antecedent and represents a condition describing a state of an input. The RHS is a consequent and represents a control action to be taken on an output.

FE represents fuel economy. MDS represents the control system utilizing the MDS module 104. PLR represents the control system utilizing the PLR sensing module 106. EMCC represents the control system utilizing the EMCC module 108. GRADE represents the control system utilizing the grade sensing module 110. P-RATIO represents the control system utilizing the P-ratio sensing module 112.

As an example, a very high value of the control signal generated by the control module 102 may turn the indicator LED green to indicate that the state of fuel economy is good. In that case, the very high value of the control signal indicates a very high fuel economy. The very high fuel economy is denoted by a term FE=VH on the RHS of the equations. Additionally, FE=H, FE=M, FE=L, and FE=VL indicate high fuel economy, medium fuel economy, low fuel economy, and very low fuel economy, respectively. Similarly, on the LHS of the equations, MDS=VH, MDS=H, MDS=M, MDS=L, and MDS=VL represent very high rating, high rating, medium rating, low rating, and very low rating for the control system utilizing the MDS module 104, respectively, etc.

A first set of rules may be as follows.

| | | |
|---|---|---|
| MDS = VH | ==→ | FE = VH |
| (EMCC = VH) and (MDS = M) | ==→ | FE = VH |
| (EMCC = H) and (MDS = H) | ==→ | FE = VH |
| PLR = VL | ==→ | FE = VH |
| (PLR = L) and (P-RATIO = H) | ==→ | FE = VH |
| (PLR = L) and (GRADE = VH) | ==→ | FE = VH |

A first rule may be that the fuel economy is very high when the value of $\mu_{MDS}$ (VH) for the MDS system is large (i.e., close to one). A second rule may be that the fuel economy is very high when the value of $\mu_{EMCC}$ (VH) for the EMCC system is large and the value of $\mu_{MDS}$ (M) for the MDS system is medium. A third rule may be that the fuel economy is very high when the value of $\mu_{EMCC}$ (H) for the EMCC system is large and the value of $\mu_{MDS}$ (H) for the MDS system is large.

A fourth rule may be that the fuel economy is very high when the value of $\mu_{PLR}$ (VL) for the control system utilizing the PLR sensing module 106 is large. A fifth rule may be that the fuel economy is very high when the value of $\mu_{PLR}$ (L) for the control system utilizing the PLR sensing module 106 is large, and the value of $\mu_{PRAT}$ (H) for the control system utilizing the P-ratio sensing module 112 is large. A sixth rule may be that the fuel economy is very high when the value of $\mu_{PLR}$ (L) for the control system utilizing the PLR sensing module 106 is large, and the value of $\mu_{GRAD}$ (VH) for the control system utilizing the grade sensing module 110 is large.

A second set of rules may be expressed as follows.

| | | |
|---|---|---|
| MDS = H | ==→ | FE = H |
| (EMCC = H) and (MDS = M) | ==→ | FE = H |
| (EMCC = VH) and (MDS = L) | ==→ | FE = H |
| PLR = L | ==→ | FE = H |
| (PLR = M) and (P-RATIO = H) | ==→ | FE = H |
| (PLR = M) and (GRADE = H) | ==→ | FE = H |

A third set of rules may be expressed as follows.

| | | |
|---|---|---|
| MDS = M | ==→ | FE = M |
| (EMCC = M) and (MDS = L) | ==→ | FE = M |
| EMCC = H | ==→ | FE = M |
| (PLR = L) and (P-RATIO = M) | ==→ | FE = M |
| (PLR = M) and (GRADE = M) | ==→ | FE = M |

A fourth set of rules may be expressed as follows.

| | | |
|---|---|---|
| MDS = L | ==→ | FE = L |
| EMCC = M | ==→ | FE = L |
| (PLR = M) and (GRADE = L) | ==→ | FE = L |
| (PLR = M) and (P-RATIO = M) | ==→ | FE = L |

A fifth set of rules may be expressed as follows.

| | | |
|---|---|---|
| EMCC = L | ==→ | FE = VL |
| PLR = VH | ==→ | FE = VL |

-continued

| | | |
|---|---|---|
| (PLR = H) and (GRADE = L) | ==→ | FE = VL |
| (PLR = H) and (P-RATIO = L) | ==→ | FE = VL |

All the rules in a set are combined in the form of a fuzzy relation. A fuzzy relation is a mapping between an input or inputs and an output based on a rule or a set of rules. In other words, a fuzzy relation transforms an input or inputs into an output based on a rule or a set of rules. Based on the fuzzy relation, multiple sets of rules generate a fuzzy set of values for the control signal.

An output of the fuzzy relation is imposed on the control signal via a compositional rule of inference. As a result, an output of a fuzzy controller is a fuzzy set of controls. For example, a fuzzy set of values of the control signal that are generated by the compositional rule of inference is shown by a set of solid lines 150 in FIG. 3.

A net value or a single crisp value of the control signal generated by the control module 102 can be determined from the fuzzy set by numerical methods such as center of gravity method, normalization method, maximum rule method, center of area method, etc. An exemplary center of area method is explained for illustrative purposes.

Figure 3:
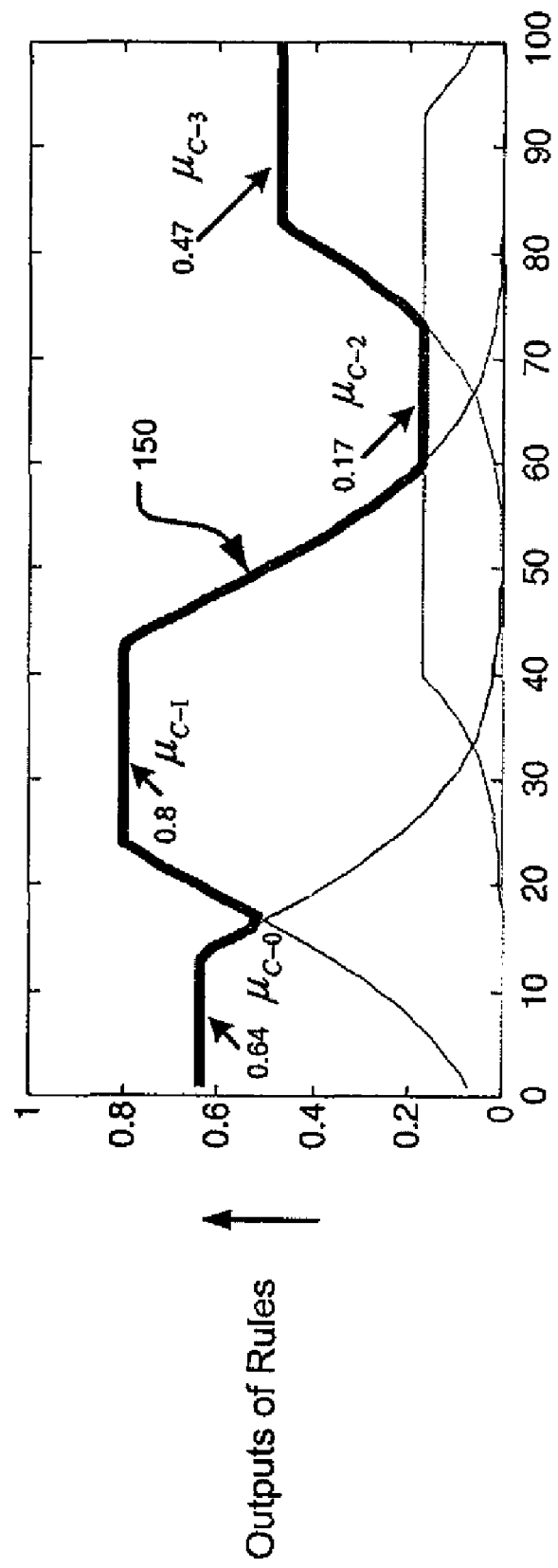
FIG. 3 is a graph of exemplary output values of fuzzy logic rules plotted on a membership function.

Referring now to FIG. 3, an exemplary fuzzy set comprises of four values output by four rules: 0.64, 0.8, 0.17, and 0.47. The fuzzy set is plotted on a membership function. According to center of area method, the net value of the control signal is given by the following equation.

$$FE(nT) = \frac{\sum_{i}^{L} \mu_{FE}(Z_i)(Z_i)}{\sum_{i}^{L} \mu_{FE}(Z_i)}$$

where T is the period of 5 seconds, n is the time index, and L represents the number of quantization levels of the output FE, $Z_i$ is the amount of control output at the quantization level i, $\mu_{FE}(Z_i)$ represents the membership value in the fuzzy set of the output at the quantization level i.

The single crisp value of the control signal FE(nT) for the fuzzy set is calculated as follows.

$$\sum_{i}^{L} \mu_{FE}(Z_i)(Z_i) = \sum_{i=0.5}^{13.5} 0.64 * i + \sum_{i=14}^{16.5} \exp(-i^2/2\sigma^2) * i +$$

$$\sum_{17}^{24} \exp(-(i-25)^2/2\sigma^2) * i + \sum_{24.5}^{42.5} 0.8 * i + \sum_{43}^{60} \exp(-(i-25)^2/2\sigma^2) * i +$$

$$\sum_{60.5}^{73.5} 0.17 * i + \sum_{74}^{82.5} \exp\left(-(i-75)^2/2\sigma^2\right) * i + \sum_{83}^{100} 0.47 * i = 2221.7$$

$$\sum \mu_{FE}(Z_i) = \sum_{i=0.5}^{13.5} 0.64 + \sum_{i=14}^{16.5} \exp(-i^2/2\sigma^2) +$$

$$\sum_{17}^{24} \exp(-(i-25)^2/2\sigma^2) + \sum_{24.5}^{42.5} 0.8 + \sum_{43}^{60} \exp(-(i-25)^2/2\sigma^2) +$$

-continued $$\sum_{60.5}^{73.5} 0.17 + \sum_{74}^{82.5} \exp\left(-(i-75)^2/2\sigma^2 + \sum_{83}^{100} 0.47 = 51.4\right)$$

Thus, FE(nT)=43.22, where σ=14.18 is a constant.

Based on the net value of the control signal, the indicator module 114 can indicate the state of fuel economy by illuminating appropriate LED or by using other indicating means. For example, when FE(nT) is close to 100 (high end), the net value of the control signal may be considered very high, and the green LED may be lit to indicate that the state of fuel economy is good. On the other hand, when FE(nT) is close to 0 (low end), the net value of the control signal may be considered very low, and the red LED may be lit to indicate that the state of fuel economy is bad.

For example, the net value 43.22 may be considered closer to 0 than to 100, and the red LED may be lit to indicate that the state of fuel economy is bad. Alternately, the value 43.22 may be considered as being close to the center of 0 and 100, and a yellow LED may be lit to indicate that the state of fuel economy is moderate, that is, neither good nor bad.

As can be appreciated, most control systems in a vehicle generally respond to driver inputs such as accelerator pedal motion and braking. Therefore, the driver may adopt behavior that causes the LED to turn and stay green and abandon the habits that cause the LED to turn red.

Some vehicles may be equipped with a power economizing system that can be turned on or off using a "Mizer" switch (not shown). The vehicle runs in fuel economy mode when the switch is turned on and in performance mode when the switch is turned off. In either mode, however, driver inputs affect fuel economy. Therefore, the system 100 works with or without the economizing system.

Although control module 102, MDS module 104, PLR sensing module 106, EMCC module 108, grade sensing module 110, P-ratio sensing module 112, and indicator module 114 are shown separately for illustrative purposes, the control module 102 may comprise at least one of the modules.

Figure 4:
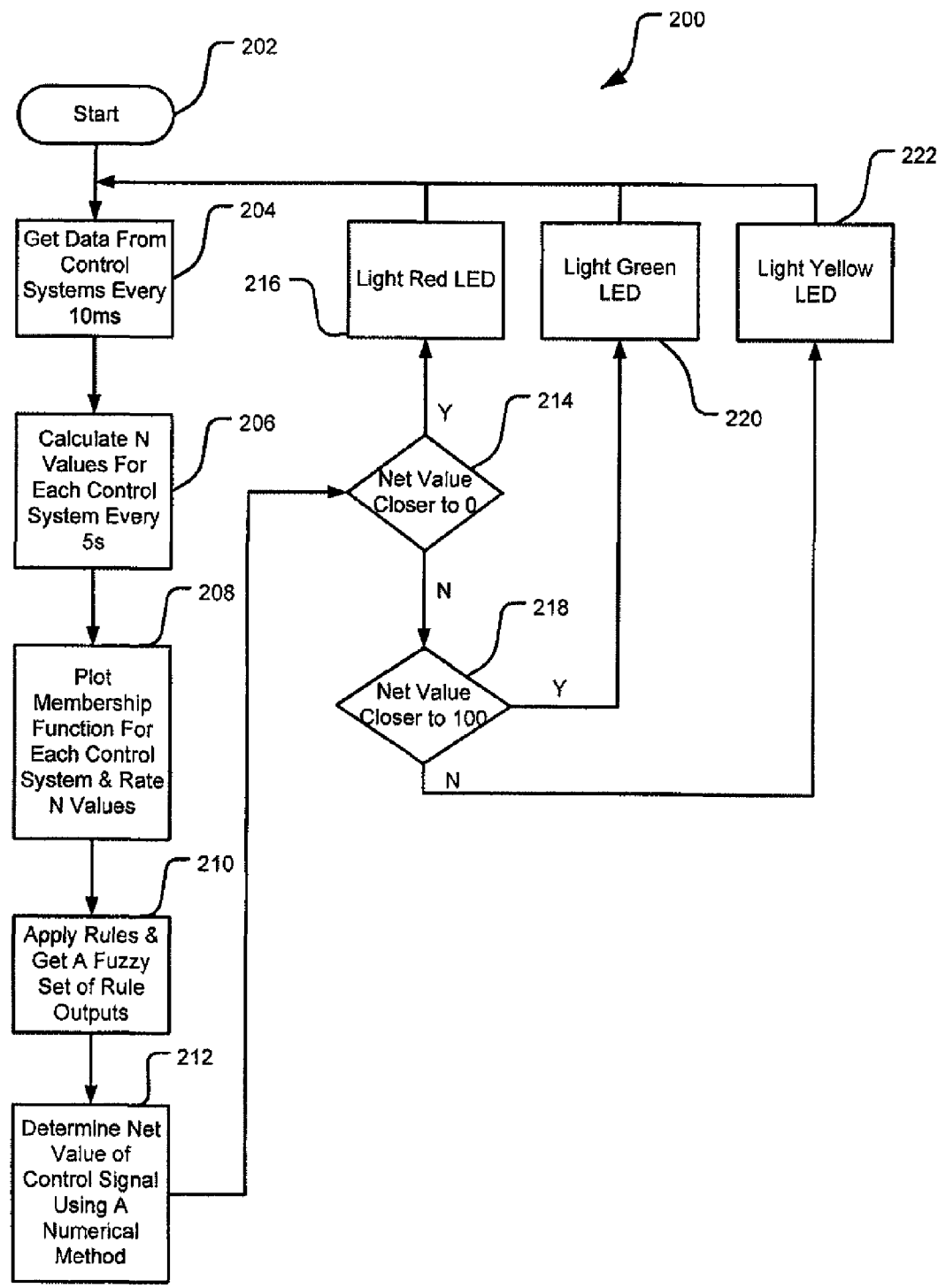
FIG. 4 is a flowchart of an exemplary method for monitoring performance of a fuel system of a vehicle.

Referring now to FIG. 4, a method 200 for monitoring performance of a fuel system is shown. The method 200 begins in step 202. The control module 102 obtains data from control systems every 10 ms in step 204. The control module 102 analyzes the data every 5 seconds and calculates N values for each control system in step 206.

The control module 102 computes a membership function for each control system and rates the N values from very high to very low in step 208. In step 210, the control module 102 combines fuzzy logic rules in the form of a fuzzy relation and imposes an output of the fuzzy relation on the control signal via a compositional rule of inference, which generates a fuzzy set of output values of the control signal. The control module 102 determines a net value or a single crisp value for the control signal from the output values in the fuzzy set using a numerical method in step 212.

The control module 102 determines in step 214 whether the net value of the control signal is closer to zero. If true, the control module 102 lights the red LED in the indicator module 114 to indicate that the state of fuel economy is bad in step 216. Otherwise, the control module 102 determines in step 218 whether the net value of the control signal is closer to 100. If true, the control module 102 lights the green LED in the indicator module 114 to indicate that the state of fuel economy is good in step 220.

Otherwise, the control module 102 determines in step 222 that the net value of the control signal is closer to the center of 0 and 100, and lights the yellow LED to indicate that the state of fuel economy is moderate. The method 200 repeats steps 204 through 222.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for monitoring performance of a fuel system in a vehicle, comprising:
    a plurality of sensing modules that periodically sense data from a plurality of control systems in said vehicle during a predetermined evaluation period;
    a control module that analyzes said data after said evaluation period, that generates performance ratings for said control systems based on said data, that generates a set of values for said performance of said fuel system based on said performance ratings and a plurality of predetermined fuzzy logic rules, and that generates a control signal based on a numerical analysis of said set of values; and
    an indicator module that indicates in real time whether said performance of said fuel system conforms to a designed performance of said vehicle based on said control signal.

2. The system of claim 1 wherein said control systems comprise at least one of a multi-displacement system, a performance request level sensing system, an electronically modulated clutch control system, a grade sensing system, and a P-ratio sensing system.

3. The system of claim 1 wherein said control module uses Gaussian Normal membership function μ for each of said control systems based on said data and said evaluation period, where μ is between 0 and 1.

4. The system of claim 3 wherein said control system generates said performance ratings based on said number μ for each of said control systems using a membership function.

5. The system of claim 1 wherein said control module assigns said control signal one of a low value and a high value based on said numerical analysis.

6. The system of claim 5 wherein said indicator module indicates said performance of said fuel system based on said one of said low value and said high value of said control signal.

7. The system of claim 1 wherein said control module assigns said control signal a net value based on said numerical analysis.

8. The system of claim 7 wherein said indicator module indicates said performance of said fuel system based on said net value of said control signal.

9. The system of claim 1 wherein said indicator module comprises at least one of a visual indicator and an audio indicator.

10. A method for monitoring performance of a fuel system in a vehicle, comprising:
    periodically sensing data from a plurality of control systems in said vehicle during a predetermined evaluation period;
    analyzing said data after said evaluation period;
    generating performance ratings for said control systems based on said data;

generating a set of values for said performance of said fuel system based on said performance ratings and a plurality of predetermined fuzzy logic rules;
generating a control signal based on a numerical analysis of said set of values; and
indicating in real time whether said performance of said fuel system conforms to a designed performance of said vehicle based on said control signal.

11. The method of claim 10 further comprising sensing said data from at least one of a multi-displacement system, a performance request level sensing system, an electronically modulated clutch control system, a grade sensing system, and a P-ratio sensing system.

12. The method of claim 10 further comprising generating a number $\mu$ using Gaussian Normal membership function for each of said control systems based on said data and said evaluation period, where $\mu$ is between 0 and 1.

13. The method of claim 12 further comprising generating said performance ratings based on said number $\mu$ for each of said control systems.

14. The method of claim 10 further comprising assigning said control signal one of a low value and a high value based on said numerical analysis.

15. The method of claim 14 further comprising indicating said performance of said fuel system based on said one of said low value and said high value of said control signal.

16. The method of claim 10 further comprising assigning said control signal a net value based on said numerical analysis.

17. The method of claim 16 further comprising indicating said performance of said fuel system based on said net value of said control signal.

18. The method of claim 10 further comprising indicating said performance of said fuel system using at least one of a visual indicator and an audio indicator.

* * * * *